US006863226B2

(12) United States Patent
Zimhoni

(10) Patent No.: US 6,863,226 B2
(45) Date of Patent: Mar. 8, 2005

(54) BRIDGELESS ROTARY SPRINKLER

(75) Inventor: Erez Zimhoni, Kfar Hes (IL)

(73) Assignee: Netafim (A.C.S.) Ltd., Tel Aviv (IL)

( * ) Notice: Subject to any disclaimer, the term of this patent is extended or adjusted under 35 U.S.C. 154(b) by 150 days.

(21) Appl. No.: 10/419,987

(22) Filed: Apr. 22, 2003

(65) Prior Publication Data

US 2003/0218079 A1 Nov. 27, 2003

(30) Foreign Application Priority Data

May 9, 2002 (IL) ................................................ 149556

(51) Int. Cl.[7] ............................ B05B 3/00; A01G 25/00

(52) U.S. Cl. .................... 239/225.1; 239/200; 239/201; 239/237

(58) Field of Search .............................. 239/225.1, 237, 239/240, 242, 261, 264, 200, 201, 202, 203, 204, 206, 252

(56) References Cited

U.S. PATENT DOCUMENTS 3,874,588 A * 4/1975 Flynn .......................... 239/11
4,583,689 A 4/1986 Rosenberg
5,671,886 A * 9/1997 Sesser ................... 239/222.21
5,984,203 A 11/1999 Rosenberg
5,984,205 A * 11/1999 Rosenberg .................. 239/233
6,016,972 A 1/2000 Kantor et al.
6,085,995 A * 7/2000 Kah et al. ................... 239/237
6,186,414 B1 2/2001 Clearman et al.

FOREIGN PATENT DOCUMENTS

GB 2 242 107 9/1991

* cited by examiner

*Primary Examiner*—Davis Hwu
(74) *Attorney, Agent, or Firm*—Nath & Associates PLLC; Gary M. Nath; Gregory B. Kang

(57) ABSTRACT

A rotary sprinkler comprises a body and a rotor. The body has an inlet bore, an outlet bore, and an internal cavity therebetween. The inlet bore has an upstream end connectable to a water supply pipe and a downstream end formed as a jet nozzle. The outlet bore has an upstream end with a rim. The rotor has an axially extending shaft with an axial shaft channel and at least one vane with a vane channel extending away from the shaft and having an outlet constituting an outlet of the sprinkler. The shaft channel and the vane channel define a smooth water flow passage having an open cross-section. The shaft is inserted in the outlet bore of the body to enable free rotation of the rotor. The sprinkler further comprises a retaining ring that is assembled to the upstream end of the shaft of the rotor, is disposed in the internal cavity of the sprinkler body, and is adapted to abut the rim of the outlet bore, thereby carrying axial forces applied to the rotor.

14 Claims, 2 Drawing Sheets

BRIDGELESS ROTARY SPRINKLER

FIELD OF THE INVENTION

This invention relates to the field of rotary sprinklers and more specifically to minisprinklers where a rotary nozzle is supported for rotation without a bridge traversing the spray jet.

BACKGROUND OF THE INVENTION

The present invention particularly refers to a rotary irrigation minisprinkler comprising a body mountable to a source of pressurized water (pipe) and having an axial bore with an inlet and an outlet formed as a water jet nozzle. The minisprinkler further comprises a rotor mounted for free rotation opposite the nozzle. The rotor has one or more water conduits extending generally radially with some curvature in the plane of rotation. The conduits accept the water jet from the nozzle and direct it to exit radially. The water passing through the curved conduits imparts a torque to the rotor, thereby providing for the rotation of the rotor and the distribution of the exiting jet in a circular area around the minisprinkler.

In most of the conventional sprinklers, the rotor is supported at one end in the body of the sprinkler, and at the other end, by an, element such as a bridge or a spider connected to the body, with the water jet exiting between the two ends. The bridge however intersects the path of the water jet. Examples of this design are disclosed in U.S. Pat. No. 4,583,689.

To avoid the use of a bridge, it has been suggested to provide the rotor with a long pin coaxial with the axis of rotation and received in the water jet nozzle in the sprinkler body. Such bridgeless arrangement is also disclosed in U.S. Pat. No. 4,583,689. Another bridgeless design is disclosed in U.S. Pat. No. 5,984,203 where the rotor of the sprinkler is supported in the outlet end of the nozzle, on a relatively short bearing. U.S. Pat. No. 6,016,972 describes a minisprinkler where the water jet nozzle is elongated and serves as an internal axis for the rotor which is slipped over the nozzle.

The minisprinkler 866 Mini Compact of Ein Dor has a compound rotor consisting of two parts: first, a thick shaft with an annular protrusion and an open channel notched in the shaft and curved in the meridional plane, and second, a wing with a skewed vane. The shaft is inserted rotatably in a bore in the sprinkler body, from the inside, so that the annular protrusion abuts the bore internal edge, and is fixed therein by press-mounting the wing over the shaft end protruding outside the bore. A water jet exits from the nozzle of the minisprinkler, enters the curved shaft channel and leaves it in radial direction. Then the jet impinges onto the skewed vane of the wing and is deflected tangentially, thereby creating a tangential force on the wing to turn the rotor.

SUMMARY OF THE INVENTION

In accordance with the present invention, there is provided a bridgeless rotary sprinkler, comprising: a body with an inlet bore, an outlet bore, and an internal cavity therebetween, all arranged along a common axis, the inlet bore having a downstream end connectable to a water supply pipe and an upstream end formed as a jet nozzle for ejecting a free water jet into said cavity, the outlet bore having an upstream end with a rim; a rotor having an axially extending shaft with a shaft channel directed along the axis, and at least one vane with a vane channel extending away from the shaft. The two channels define a smooth water flow passage with an open section between the inlet and the outlet. The vane channel is curved in such a way as to provide a tangential reaction force from an exiting water flow. The shaft is inserted in the outlet bore of the body to enable free rotation of the rotor. The inlet of the shaft channel faces and is aligned with the jet nozzle so as to accept smoothly the free water jet. The sprinkler further comprises a retaining ring. The ring is assembled to the upstream end of the shaft, it is disposed in the internal cavity and is adapted to abut the rim of the outlet bore, thereby carrying axial forces applied to the rotor.

The jet nozzle protrudes into the internal cavity while a portion of the retaining ring overhanging the end of the shaft receives freely a portion of the jet nozzle. The interaction of the nozzle and the ring limits the radial play of the shaft with respect to the nozzle and prevents their misalignment. The retaining ring is pressed on the shaft and is preferably made of low-friction and/or low-wear material.

The body of the rotary sprinkler is assembled from an upstream part formed with the inlet bore and a downstream part formed with the outlet bore. The parts are sealed along a contour dividing the internal cavity. Preferably, the two parts are adapted to be assembled and dissembled by a bayonet lock and have external wings facilitating the assembly.

The water flow passage has an open C-like cross-section. An exit portion of the vane channel may have only a bottom and one side wall at the outer side of the curved vane channel. The diameter of the shaft channel is larger than the diameter of the outlet orifice of the water jet nozzle so as to provide for a smooth jet entry accounting for the radial play of the rotor. The space between the outlet orifice and the inlet of the shaft channel is preferably very small but allowing for the passage of contaminating particles therethrough.

The rotary sprinkler of the present invention offers numerous advantages:

- Hydrodynamically optimized flow path including minimal distance, axial alignment and diameter agreement between the water jet nozzle and the inlet of the shaft channel of the rotor, integral and smooth water passage from the shaft channel to the vane channel. Thereby the pressure in the supply line is transformed with minimal losses into water jet velocity;
- Non-pressurized chamber that does not need sealing, in particular between the outlet bore and the rotor rotating therein;
- Enhanced control over the distribution of water and the torque due to the elongated and smooth water passage in the rotor;
- Small water losses in spray and dripping water between parts of the sprinkler;
- Stable position, less tilting, less friction, no seizure of the rotor due to the interaction of the retaining ring and the nozzle limiting the radial play of the rotor;
- Less friction and wear in the thrust bearing obtained by the usage of special material for the retaining ring;
- Low sensitivity to clogging by avoiding entry of foreign particles in the bearing support area and facilitating their discharge therefrom;
- Simplified assembly and convenient maintenance due to the bayonet lock, the wings, and the pressure mount of the retaining ring; and
- Low-cost and simple production due to the small number of parts.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
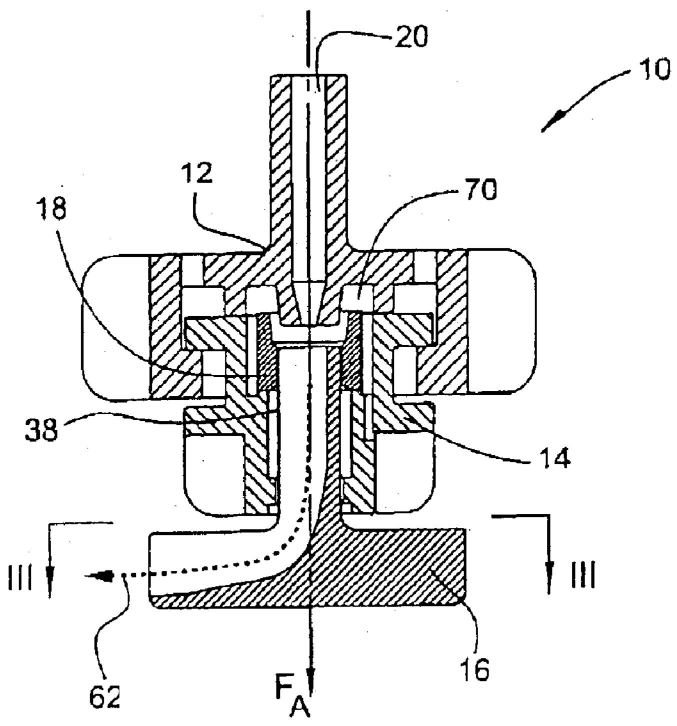
FIG. 1 is a side sectional view of an assembled rotary sprinkler according to the present invention.
Figure 2:
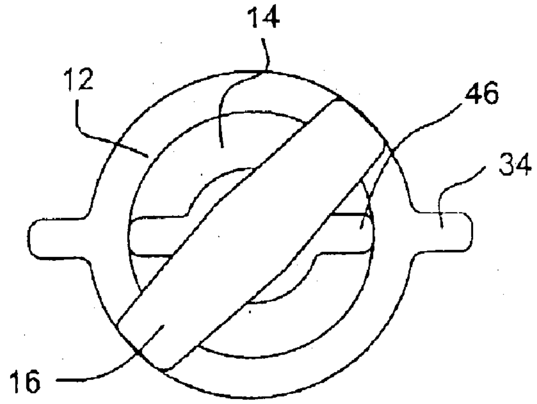
FIG. 2 is an axial view of the rotary sprinkler of FIG. 1 from the bottom of the rotor.
Figure 3A:
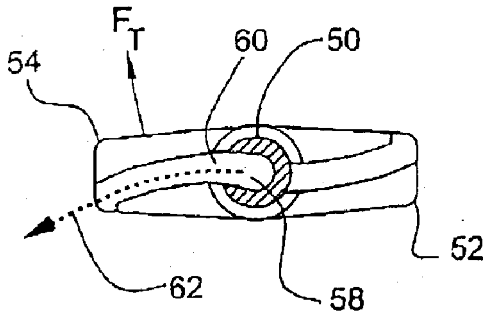
FIG. 3A is an axial sectional view of the sprinkler rotor of FIG. 1 in the plane III—III.
Figure 3B:
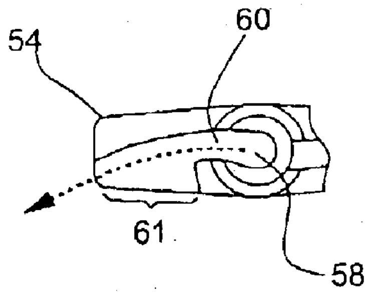
FIG. 3B shows a variant of channel exit of the rotor of FIG. 3A.
Figure 4:
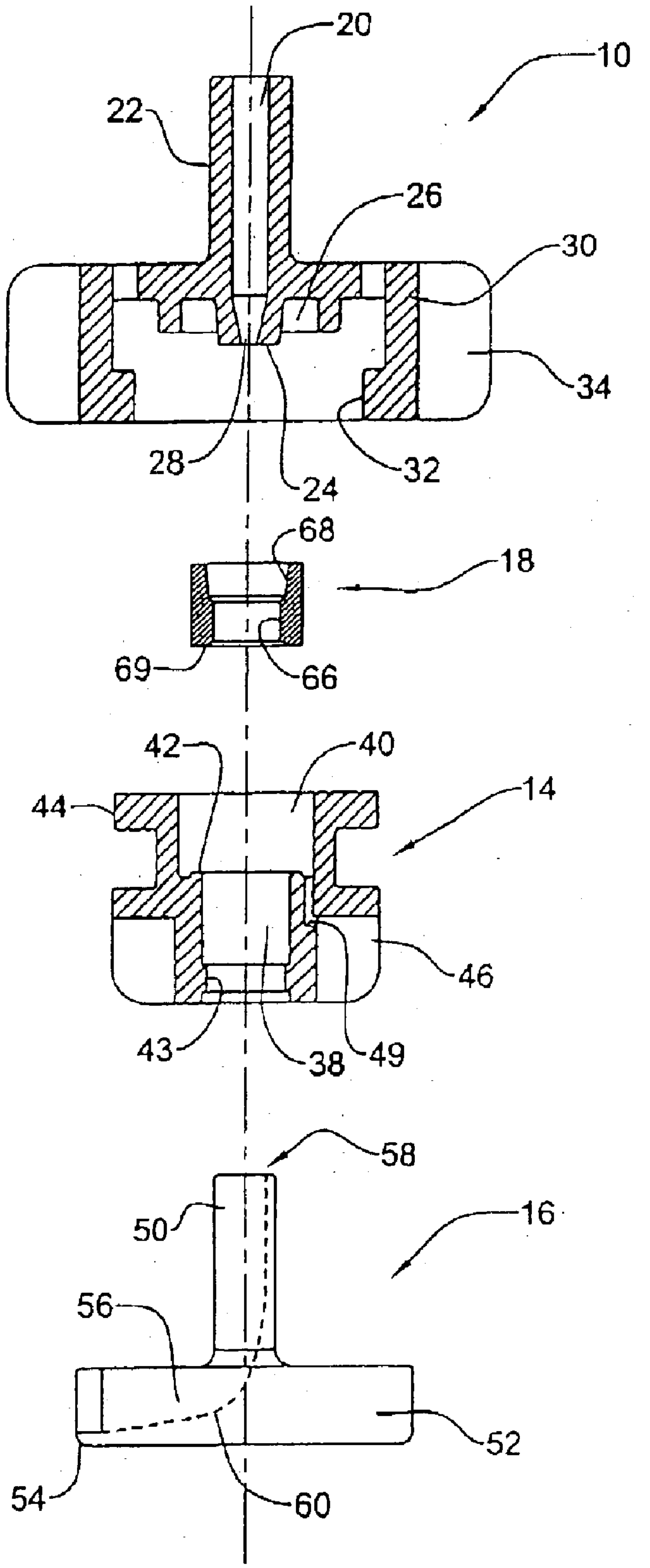
FIG. 4 is an exploded sectional view of the sprinkler shown in FIG. 1.

With reference to the assembly drawing in FIGS. 1 and 2, and the part drawings in. FIGS. 3 and 4, a bridgeless rotary sprinkler 10 according to the present invention comprises an upstream part 12, a downstream part 14, a rotor 16 and a retaining ring 18. The upstream part 12 has an inlet bore 20 with an upstream end formed as a nipple 22 connectable to a water supply pipe, and a downstream end formed as a jet nozzle 24 with orifice 28 protruding in a recess 26. The upstream part 12 has also an annular wall 30 carrying outer lugs 32 of a bayonet lock, and wings 34.

Figure 5A:
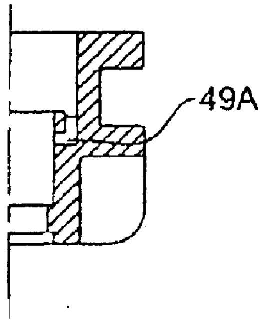
FIGS. 5A and 5B show variants of drain channels formed in the sprinkler of FIG. 1.
Figure 5B:
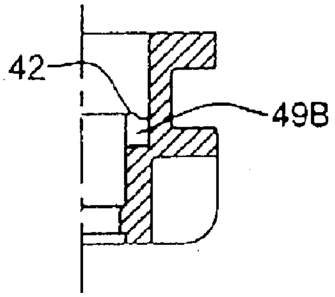

The downstream part 14 has an outlet bore 38, a recess 40 with a supporting rim 42 on the shoulder between the recess and the bore, and a supporting annular protrusion 43 in the outlet bore 38. The downstream part 14 carries internal lugs 44 of the bayonet lock, and has wings 46. The recess 40 may be connected to the ambient atmosphere by a plurality of drain channels 49. The drain channels may lead towards the outlet bore 38 (see channel 49A in FIG. 5A) or may be formed as slits 49B interrupting the rim 42 (see FIG. 5B).

The rotor 16 has a tubular shaft 50 and two radially extending vanes 52 and 54. A smooth water flow passage 56 is formed in the rotor from an axially extending channel 58 in the shaft 50 and a transverse vane channel 60 in the vane 54, the two channels being connected by a smooth turn. The inlet of the axial channel 58 is axially aligned with the jet nozzle 24. The vane channel 60 is curved in such a way as to provide a tangential reaction force $F_T$ relative to the axis of the shaft 50 from a water flow 62 exiting the water passage 56. The channel has an open cross-section form, for example C-like form, as shown in FIG. 3A. The exit portion 61 of the channel 60 may have a reduced sidewall at the internal side of the curve, as shown in. FIG. 3B. The internal sidewall may be removed to reduce water flow friction losses because the flow is anyway biased to the outer wall by the inertia force due to the channel curvature. The other vane 52 has the same shape as the vane 54 (for dynamic balance) but has no water passage therein. The rotor 16 is preferably made as a unitary body but also may be assembled from two or more parts, providing a smooth water passage is ensured.

The retaining ring 18 has a bore with a setting portion 66 adapted to be tightly pressed on the end of the shaft 50, and a flared inlet portion 68. The inlet portion 68 receives for free rotation the jet nozzle 24, while the downstream face 69 of the ring must rotate in contact with the supporting rim 42, as will be explained below. Therefore, the retaining ring 18 is preferably made of low-friction and low-wear material.

In the assembled and locked sprinkler shown in FIGS. 1 and 2, all parts are arranged along a common axis. The recess 26 of the upstream part 12 and the recess 40 of the outlet body 14 form an internal cavity 70 between the inlet bore 20 and the outlet bore 38. The shaft 50 of the rotor 16 is inserted in the outlet bore 38 and then the retaining ring 18 is pressed on the free shaft end preventing further removal of the rotor 16 from the downstream part 14. The rotor however has some axial and radial play and can freely rotate in the bore 38. The annular protrusion 43 provides a rotation support (sliding bearing) for the rotor.

The inlet portion 68 of die retaining ring 18 receives the protruding jet nozzle 24 with a limited radial play and thereby prevents misalignment of the water jet and the inlet of the axial channel 58. The sprinkler 10 may be easily assembled and dissembled by turning the upstream part 12 with respect to the downstream part 14 using the wings 34 and 46, thereby locking or unlocking the bayonet lock.

When pressurized water is supplied to the nipple 22 of the sprinkler, a water jet is ejected from the nozzle 24 into the axial channel 58. Following the smooth curve of the continuous water passage 56, the water flow turns in transverse direction along the vane channel 60 and leaves the sprinkler as a free jet 62. Due to the curvature of the vane channel in a plane perpendicular to the rotor axis, a tangential reaction force $F_T$ is generated and the corresponding torque imparts rotation to the rotor 16. As a result, the free water jet is distributed in a circle around the sprinkler. The single water jet is best adapted to obtain maximal exit velocity and radius of irrigation which may reduce the number of necessary sprinklers per given area. Dividing the water flow into two or more jets increases the friction losses in the larger number of channels and turbulence losses in the place of division.

The water flow creates also an axial force $F_A$ urging the rotor 16, particularly the retaining ring 18, to the supporting rim 42, the latter providing an axial support (thrust bearing) to the rotor. Since the water normally passes through the internal cavity 70 as a free water jet, the cavity is not pressurized and the gap between the retaining ring 18 and the supporting rim 42 need not to be sealed.

The form of the jet nozzle 24, and in particular the diameter of the orifice 28 is coordinated with the diameter of the downstream axial channel 58 and the radial play of the rotor shaft 50 so as to provide a smooth entry of the water jet originating from the nozzle 24 into the water passage 56. The distance from the orifice 28 to the inlet of the axial channel 58 is kept minimal with the same purpose, but large enough to let through particles that may be contaminating the irrigation water.

Although a description of a specific embodiment has been presented, it is contemplated that various changes could be made without deviating from the scope of the present invention. For example, the rotor of the present invention could be modified by adding more vanes or vane channels for obtaining water jets with different range on the same sprinkler.

What is claimed is:

1. A rotary sprinkler, comprising:

a body with an inlet bore, an outlet bore, and an internal cavity therebetween, all arranged along a common axis, the inlet bore having an upstream end connectable to a water supply pipe and a downstream end formed as a jet nozzle for ejecting a free water jet into said cavity, the outlet bore having an upstream end with a rim;

a rotor having an axially extending shaft with a shaft channel directed along the axis and having an inlet, and at least one vane with a vane channel extending away from the shaft and having an outlet constituting an outlet of the sprinkler, the shaft channel and the vane channel defining a smooth water flow passage between said inlet and said outlet, said passage having an open cross-section, said shaft being inserted in the outlet bore of the body to enable free rotation of the rotor, the inlet of said share channel facing and being aligned with said nozzle so as to accept smoothly said fee water jet, wherein said sprinkler further comprises a retaining ring that is assembled to the upstream end of said shaft, is disposed in said internal cavity, and is adapted to abut the rim of the outlet bore, thereby carrying axial forces applied to said rotor.

2. A rotary sprinkler according to claim 1, wherein said jet nozzle is protruding into said internal cavity, and said shaft of the rotor is provided with a means interacting with said jet nozzle to limit a radial play of said shaft with respect to said jet nozzle and thereby to prevent their misalignment.

3. A rotary sprinkler according to claim 1, wherein said body is assembled from two or more parts.

4. A rotary sprinkler according to claim 3, wherein said body is assembled from an upstream part formed with said inlet bore, and a downstream part formed with said outlet bore, said parts being sealed along a contour dividing said internal cavity.

5. A rotary sprinkler according to claim 4, wherein said upstream part and said downstream part are adapted to be assembled and dissembled by a bayonet lock.

6. A rotary sprinkler according to claim 4, wherein at least one of said upstream part and said downstream part has wings facilitating the assembly.

7. A rotary sprinkler according to claim 2, wherein said retaining ring has a portion freely receiving therein a portion of said jet nozzle and constituting a means limiting said radial play.

8. A rotary sprinkler according to claim 1, wherein said retaining ring is at least in part made of material different from the material of the shaft.

9. A rotary sprinkler according to claim 8, wherein at least one of said retaining ring and said rim is made of materials providing low friction and/or low wear.

10. A rotary sprinkler according to claim 1, wherein said rotor is a unitary body.

11. A rotary sprinkler according to claim 1, wherein said vane channel is at least in part of its length an open channel with a bottom and one side wall.

12. A rotary sprinkler according to claim 11, wherein said vane channel is curved and said one sidewall is at the outer side of the curve.

13. An irrigation system, comprising a water supply pipe and a rotary sprinkler according to claim 1.

14. An irrigation system according to claim 13, wherein said rotary sprinkler is connected to said water supply pipe and is mounted with the outlet bore directed downward.

* * * * *